United States Patent [19]
Deblauwe et al.

[11] Patent Number: 5,895,803
[45] Date of Patent: Apr. 20, 1999

[54] PROPYLENE POLYMERS AND PROCESS FOR THE PREPARATION THEREOF

[75] Inventors: Veerle Deblauwe, Londerzeel, Belgium; Antonio Belforte, Rosignano-Solvay/Li, Italy; Mathieu Wilkin, Brussels, Belgium

[73] Assignee: Solvay Polyolefins Europe-Belgium, Brussels, Belgium

[21] Appl. No.: 08/881,844

[22] Filed: Jun. 25, 1997

Related U.S. Application Data

[63] Continuation of application No. 08/437,714, May 9, 1995, abandoned.

[30] Foreign Application Priority Data

May 10, 1994 [IT] Italy .................................. MI94A0922

[51] Int. Cl.$^6$ .......................... C08F 210/08; C08F 210/02
[52] U.S. Cl. ................................... 526/348.6; 526/124.9; 526/125.3
[58] Field of Search ................ 526/124.9, 125.3, 526/348.6

[56] References Cited

U.S. PATENT DOCUMENTS

| | | | |
|---|---|---|---|
| 4,322,514 | 3/1982 | Migoshi et al. | 526/348.6 |
| 4,404,342 | 9/1983 | Migoshi et al. | 526/348.6 |
| 4,761,462 | 8/1988 | Kitamura et al. | 526/348.6 |
| 5,247,031 | 9/1993 | Kioka et al. | 526/348.6 |
| 5,438,110 | 8/1995 | Ishimarua et al. | 526/348.6 |

FOREIGN PATENT DOCUMENTS

| | | |
|---|---|---|
| 0145014 | 6/1985 | European Pat. Off. |
| 0146968 | 7/1985 | European Pat. Off. |
| 0577407 | 1/1994 | European Pat. Off. |
| 63-95208 | 4/1988 | Japan |
| 63-95209 | 4/1988 | Japan |

OTHER PUBLICATIONS

Translations of Japanese 63–95208 and 63–95209.

*Primary Examiner*—Edward J. Smith
*Attorney, Agent, or Firm*—Venable George H. Spencer; John W. Schneller

[57] ABSTRACT

Statistical propylene copolymer containing 0.2–0.9% by weight monomeric units derived from ethylene; 13–21% by weight monomeric units derived from α-olefin having 4–10 carbon atoms, and 78.1–86.8% by weight monomeric units derived from propylene. The copolymer has a melting point of 115–125° C.; a proportion of polymer soluble in boiling heptane greater than or equal to 95% by weight, and a proportion of polymer soluble in cold xylene (25° C.) greater than 40% by weight.

7 Claims, No Drawings

PROPYLENE POLYMERS AND PROCESS FOR THE PREPARATION THEREOF

CROSS-REFERENCE TO RELATED APPLICATION

This application is a Continuation of application Ser. No. 08/437,714, filed May 9, 1995, now abandoned.

This application claims the priority of Application No. MI94A000922 filed in Italy on May 10, 1994, that application and the subject matter disclosed therein being incorporated herein by reference.

BACKGROUND OF THE INVENTION

The present invention pertains to propylene polymers, and more specifically to copolymers having both a low sealing temperature and a relatively high melting point. The present invention also pertains to a process for preparing said copolymers.

It is a known practice to use statistical propylene copolymers containing 1-butene and that can contain ethylene for the production of films.

Accordingly, patent publications EP-A-0145014 and EP-A-0146968, for example, describe the production of drawn films using terpolymers containing 8–30% molar of α-olefins having at least 4 carbon atoms and less than 3% molar of ethylene and which must contain at least 7% by weight of polymer insoluble in boiling heptane. These patent publications describe in particular copolymers which are produced by using a catalytic system containing a titanium trichloride-based solid, an alkylaluminum chloride and a methacrylic acid ester. The polymers, which contain relatively high quantities of chlorinated residues coming from the catalytic system, make it possible to prepare films having satisfactory optical and mechanical properties as well as advantageous sealing properties. According to these patent publications, films prepared by using polymers containing a smaller proportion of polymer insoluble in boiling heptane are not sufficiently resistant to scratching or have a low contact blocking ("anti-blocking" property). The example embodiments disclose binary propylene and butene copolymers and a terpolymer containing 0.9% by weight ethylene, 16% by weight butene, and a proportion of 15.8% by weight which is insoluble in boiling heptane, whose solubility in cold xylene amounts to 32.7% by weight.

Patent Publication EP-A-0577407 describes propylene copolymers containing ethylene and an α-olefin containing 4–10 carbon atoms. According to this patent publication, the proportion of polymer soluble in cold xylene must be sufficiently small for the polymer to present a satisfactory compromise between rigidity and sealing temperature. In this case, the patent publication recommends that for terpolymers containing less than 1.5% by weight ethylene, the proportion soluble in cold xylene not exceed 12% by weight.

It was noted that in certain cases the implementation of the polymers involves a number of problems. Specifically, it has been observed in the production of mono- or bi-drawn films that the polymers adhere to the drawing rollers.

SUMMARY OF THE INVENTION

Statistical propylene copolymers have now been found that contain ethylene and an α-olefin having both advantageous mechanical and sealing properties and that do not lead to this type of problem.

DETAILED DESCRIPTION OF THE INVENTION

For this purpose, the present invention pertains to a statistical propylene copolymer containing:

0.2–0.9% by weight monomeric units derived from ethylene;

13–21% by weight monomeric units derived from α-olefin having 4–10 carbon atoms;

78.1–86.8% by weight monomeric units derived from propylene, which concurrently have:

a melting point of 115–125° C.;

a proportion greater than or equal to 95% by weight polymer soluble in boiling heptane;

a proportion exceeding 40% by weight polymer soluble in cold xylene (25° C.).

The copolymers according to the present invention preferably contain at least 0.4% by weight monomeric units derived from ethylene. The quantity of monomeric units derived from ethylene also preferably does not exceed 0.8% by weight. Satisfactory results are obtained when the quantity of monomeric units derived from ethylene is 0.4–0.8% by weight.

α-olefins containing 4–10 carbon atoms, hereinafter referred to simply as α-olefins, which are preferred in this application, are 1-butene and 1-hexene with 1-butene being particularly suitable. The quantity of α-olefin contained in the copolymers according to the invention is preferably at least 15% by weight. Furthermore, the quantity should generally not exceed 19% by weight. Satisfactory results are obtained when the quantity of monomeric units derived from the α-olefin is 15–19% by weight.

The copolymers according to the invention that yield the best results contain simultaneously 0.4–0.7% by weight ethylene, 15–19% by weight 1-butene, and 84.6–80.3% by weight propylene.

The melting point of the copolymers according to the present invention, measured in accordance with standard ASTM D 3418, is preferably 116–122° C.

The copolymers according to the present invention preferably contain a proportion of polymer soluble in boiling heptane that is greater than or equal to 97% by weight. Particularly satisfactory results are obtained when they are totally soluble in boiling heptane.

The proportion of polymers according to the present invention that are soluble in cold xylene preferably exceeds 43% by weight. Furthermore, this proportion should be less than or equal to 50% by weight.

The copolymers according to the present invention also generally have a melt fluidity index of 1–20 g/10 min, preferably 4–10 g/10 min.

One of the particularly important characteristics of the copolymers according to the present invention is that their performance is satisfactory despite the presence of considerable proportions of polymers soluble in hydrocarbons. In particular, they present a compromise between their sealing temperature and their particularly favorable melting point. Indeed, the copolymers according to the present invention generally have a sealing temperature as defined hereinafter of 100–106° C. They are thus particularly suited to the preparation of films drawn in at least one direction, such as mono- or bioriented films. They are also particularly suitable for the production of sealable films and/or for the production of sealing layers of multilayer films.

More particularly it is noted that welds made on films containing copolymers according to the present invention have a particularly high level of resistance. It is also noted that surface treatments have particularly little effect on the performances of the films produced using copolymers according to the present invention.

The present invention also relates to a process for preparing copolymers according to the invention.

The copolymers according to the present invention are generally prepared by gaseous-phase polymerization of propylene, ethylene, and α-olefin having 4–10 carbon atoms, using a catalytic system comprising:

a catalytic solid containing magnesium, titanium, and chlorine as essential components;

an organoaluminic compound; and an electron donor compound selected from among:
aromatic carboxylic acids esters; and
alkylalkoxysilanes having the formula $$R^1_n Si(OR^2)_{4-n}$$

wherein $R^1$ represents a hydrocarbonic group containing 1–12 carbon atoms, $R^2$ represents a hydrocarbonic group containing 1–8 carbon atoms, and n is 1, 2, or 3.

Of course, the n groups $R^1$ and the 4-n groups $R^2$ can each represent identical or different groups, independently of each other.

The catalytic solids that can be used in the processes according to the invention are well known to those skilled in the art. They most often also contain an electron donor compound generally selected from among the aromatic carboxylic acid mono- and diesters.

Examples of catalytic solids that can be used according to the invention are catalytic solids marketed under the name SHAC by the SHELL company.

The organoaluminic compound is generally selected from among the compounds having the general formula $$AlR_m X_{3-m}$$

wherein

R is a hydrocarbonic radical containing 1–18 carbon atoms;

X is a halogen; and m is a number such that $0 < m \leq 3$.

The organoaluminic compounds preferably used are selected from among the trialkyl aluminums.

The type of electron donor compound generally depends on the catalytic solid used. Ethyl or butyl benzoate and ethyl toluate can be cited as aromatic carboxylic acid esters that can be used according this invention. Aromatic carboxylic acid esters whose aromatic radical is substituted with at least one alkyloxy group containing 1–5 carbon atoms are particularly suitable esters according to this invention. A compound of this type that is particularly well suited is para-ethoxyethylbenzoate.

Alkoxysilanes that can be used according to the invention are most often such that $R^1$ is a hydrocarbonic group containing 2–5 carbon atoms and R2 represents a hydrocarbonic group containing 1–3 carbon atoms. Preferably, n is equal to 1 or to 2.

The alkylalkoxysilanes are generally preferred. Among the latter, n-propyltrimethoxysilane yields highly satisfactory results.

The different components of the catalytic system can be introduced separately into the polymerization reactor. They can also be placed into contact with each other or successively before they are placed in the reactor. The different components are preferably introduced separately into the polymerization reactor.

The different components are generally used in quantities such that the molar ratio between the aluminum contained in the organoaluminic compound and the titanium contained in the catalytic solid is greater than or equal to 20 and more particularly is greater than or equal to 40. This ratio is also most often less than or equal to 80 and is preferably less than or equal to 70. Satisfactory results are obtained when the ratio is 40–70.

Preferred catalytic systems are generally such that the molar ratio between the aluminum in the organoaluminic compound and the electron donor compound is less than 7. The ratio is also most often greater than or equal to 1, and preferably less than or equal to 6. Satisfactory results are obtained when said ratio is greater than or equal to 1.5. Highly satisfactory results are obtained when said ratio is 1.5 to 6.

When the polymerization takes place with a higher ratio, the morphology of the copolymer obtained is unsatisfactory and can lead to problems in discharging the polymerization reactor. When the ratio is lower, the polymerization yield is insufficient.

The pressure and temperature conditions of the polymerization reactor are preferably such that there is no condensation of the gaseous phase containing the different monomers.

The temperature at which the polymerization takes places is generally 20–150° C. and preferably 45–95° C. Satisfactory results are obtained when said temperature is 50–70° C. The polymerization is generally carried out at a pressure greater than or equal to atmospheric pressure. The pressure is also most often less than or equal to 50 $10^5$ Pa. Satisfactory results are obtained when the pressure is 20–40 $10^5$ Pa. Of course, the temperature and pressure are selected such that the condensation of the gaseous phase is avoided, i.e., so that the polymerization is carried out in the substantial absence of liquid phase.

The mean molecular mass of the copolymers prepared using the processes according to the invention can be adjusted by adding one or more agents to adjust the mean molecular mass, such as hydrogen, diethyl zinc, alcohols, ethers, and alkyl halogenides, with hydrogen being particularly suitable.

EXAMPLES

The following examples illustrate the invention. The meaning of the symbols used in said examples, the units expressing the values mentioned, and the methods for measuring said values are explained below.

C2 content of monomeric units derived from ethylene determined by Fourier transform IR spectrometry, with 733 cm$^{-1}$ and 720 cm$^{-1}$ absorption bands, and expressed in percentage by weight.

C4 content of monomeric units derived from 1-butene determined by Fourier transform IR spectrometry, using the 767 cm$^{-1}$ absorption band on a 200 μm pressed film, and expressed in percentage by weight.

C3 content of monomeric units derived from propylene determined using the mass balance and expressed in percentage by weight.

MFI melt fluidity index measured at 230° C. under a load of 2.16 kg and expressed in g/10 min (standard ASTM D 1238).

Tf melting point measured using differential scanning calorimetry according to standard ASTM D 3418.

FSX proportion of copolymer soluble in xylene at 25° C., expressed in percentage by weight and measured as follows: 3 g of copolymer is dissolved in 200 ml of m-xylene. The solution is then placed for 30 minutes in a thermostatically-controlled bath at 25° C., and then filtered. The filtrate is evaporated dry, is dried, and weighed.

SHp proportion of copolymer soluble in boiling heptane, expressed in percentage by weight, measured by extraction with n-heptane for 14 hours in a Soxhlet apparatus whose reflux frequency is 1 cycle every 5 minutes; the extraction residue is dried and weighed.

Tsc sealing temperature measured as follows: the untreated surfaces of two coextruded and bioriented 22 μm films are placed between the jaws of a Toyo Seiki welding machine with a heated jaw. A pressure of 3 bar is applied for one second. After cooling, a 100 mm/min traction test is conducted. The Tsc is the temperature, expressed in °C., at which the weld presents a resistance of 100 g/cm. Coextruded bioriented films are composed of a center layer of propylene homopolymer (MFI: 2.8 g/10 min) having a thickness of 20 μm, and two outside layers of the copolymer according to the invention having a thickness of 1 μm. The drawing in the direction of the machine is 5 times and 9.5 times in the transverse direction.

Example 1

In a fluid bed reactor, 50 cm in diameter and 250 cm high, equipped with a fluidization gas distribution grid and operating continuously, a compressor is used to circulate, in a stable stationary concentration, a gaseous shuttle containing nitrogen, propylene, ethylene, 1-butene, and hydrogen having the following composition:

nitrogen content: 74.7% molar;

molar ratios:

hydrogen/propylene: 0.011 mole/mole ethylene/propylene: 0.017 mole/mole 1-butene/propylene: 0.302 mole/mole.

The total pressure of the reactor is set at 36 bar and the temperature is set at 60° C. The gaseous shuttle passes through the fluid bed at a speed of 0.31 m/s.

A catalytic system containing the following is placed in the reactor:

a catalytic solid containing magnesium, titanium, chlorine, and an electron donor marketed by SHELL under the name SHAC 201 (1);

triethylaluminum (TEAL) (2);

n-propyltrimethoxysilane (NPTMS) (3).

These components are added separately in quantities such that the atomic ratio between the aluminum in component (2) and the titanium in component (1) is 50. The molar ratio between the aluminum in component (2) and component (3) is 3.5.

The holding time for the polymer particles in the reactor is approximately 3 hours.

Under the foregoing conditions, a copolymer is obtained in the form of particles having a mean diameter of 0.7 mm. The proportion under 100 μm represents 1% by weight of the copolymer. The proportion under 250 μm represents 11% by weight of the copolymer.

The properties of the copolymer are as follows:

C2=0.7; C4=17.4; C3=81.9; MFI=3.5; Tf=120; Tsc=103; SHp=100; and FSX=46.

Example 2

The same process as in Example 1 is used, except for the following specific conditions.

Hydrogen/propylene molar ratio: 0.038 mole/mole

Ethylene/propylene molar ratio: 0.008 mole/mole 1-butene/propylene molar ratio: 0.250 mole/mole Polymerization temperature: 65° C.

Catalytic solid (1): marketed by SHELL under the name SHAC 103.

Catalytic component (3): p-ethoxyethylbenzoate (PEEB).

The atomic ratio between the aluminum in component (2) (triethylaluminum) and the titanium in component (1) is 70. The molar ratio between the aluminum in component (2) and component (3) is 2.

The copolymer occurs in the form of particles having a mean diameter of approximately 0.7 mm. There is no proportion under 100 μm. The proportion under 250 μm represents 9% by weight of the copolymer.

The properties of the terpolymer are as follows:

C2=0.7; C4=17.7; C3=81.6; MFI=3.3 g/10 min; Tf=116.6; Tsc=104; SHp=100; and FSX=44.7.

It will be understood that the above description of the present invention is susceptible to various modifications, changes and adaptions and the same are intended to be comprehended within the meaning and range of equivalents of the appended claims.

What is claimed is:

1. A statistical propylene copolymer comprising:

0.2–0.9% by weight monomeric units derived from ethylene;

13–21% by weight monomeric units derived from 1-butene;

78.1–86.8% by weight monomeric units derived from propylene, said copolymer having:

a melting point of 115–125° C.;

a proportion of polymer soluble in boiling heptane greater than or equal to 95% by weight; and a proportion of polymer soluble in cold xylene (25° C.) greater than 40% by weight.

2. The copolymer according to claim 1, wherein the content of monomeric units derived from ethylene is 0.4–0.8% by weight.

3. The copolymer according to claim 1, wherein the content of monomeric units derived from butene is 15–19% by weight.

4. The copolymer according to claim 1, having a sealing temperature of 100–106° C.

5. The copolymer according to claim 1, having a proportion of polymer soluble in boiling heptane greater than or equal to 97% by weight.

6. The copolymer of claim 1 which is a statistical propylene copolymer comprising:

0.2 to 0.9% by weight monomeric units derived from ethylene;

13 to 21% by weight monomeric units derived from 1-butene;

78.1 to 86.8% by weight monomeric units derived from propylene, said copolymer having:

a melting point of 115 to 125° C.;

a proportion of polymer soluble in boiling heptane greater than or equal to 95% by weight;

a proportion of polymer soluble in cold xylene (25° C.) greater than 40% by weight;

a melt fluidity index of 4 to 10 g/10 min.; and a sealing temperature of 100 to 106° C.

7. The copolymer of claim 1, which is a statistical propylene copolymer comprising:

0.4 to 0.8% by weight monomeric units derived from ethylene;

15 to 19% by weight monomeric units derived from 1-butene;

84.6 to 80.3% by weight monomeric units derived from propylene, said copolymer having:

a melting point of 115 to 125° C.;

a proportion of polymer soluble in boiling heptane greater than or equal to 95% by weight; and a proportion of polymer soluble in cold xylene (25° C.) greater than 40% by weight;

a melt fluidity index of 4 to 10 g/10 min.; and a sealing temperature of 100 to 106° C.

* * * * *